March 30, 1965    T. A. GRAHAM    3,175,267
BAND ATTACHING MEANS FOR PIPE CLAMP HAVING MALLEABLE JAWS
Filed Aug. 21, 1963
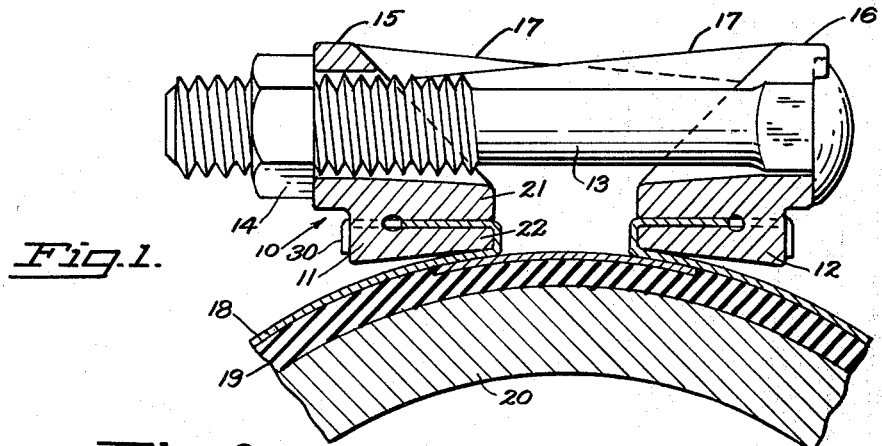
Fig. 1.
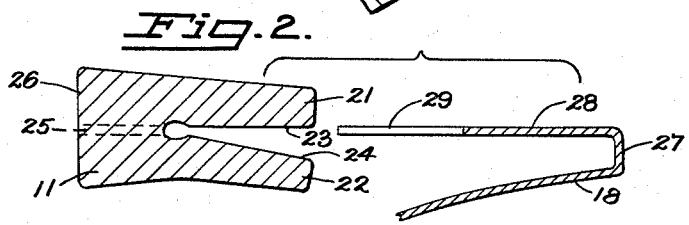
Fig. 2.
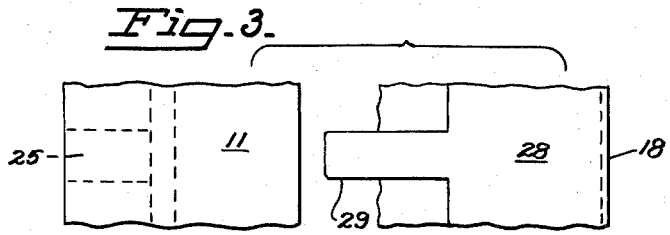
Fig. 3.
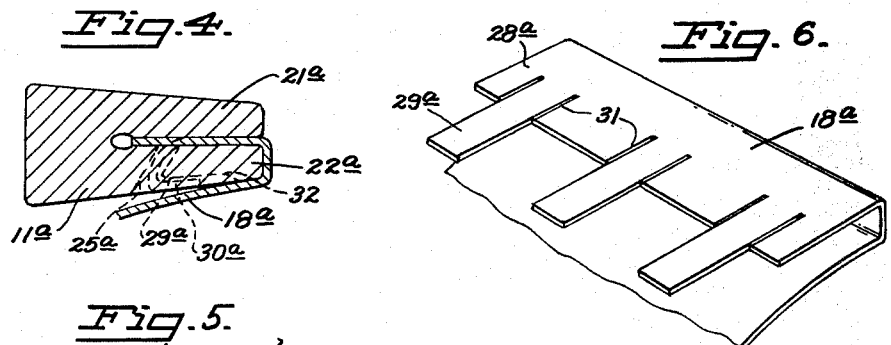
Fig. 4.
Fig. 6.
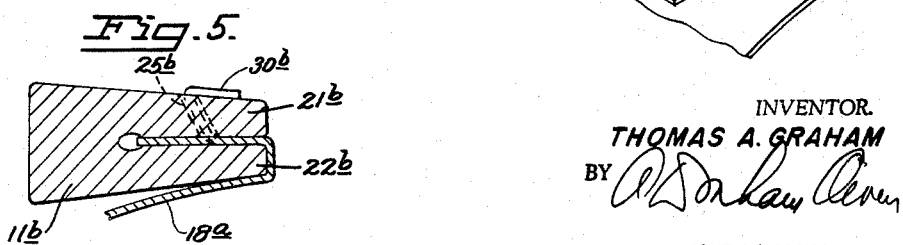
Fig. 5.
INVENTOR.
THOMAS A. GRAHAM
BY
ATTORNEY United States Patent Office 3,175,267
Patented Mar. 30, 1965

3,175,267
BAND ATTACHING MEANS FOR PIPE CLAMP
HAVING MALLEABLE JAWS
Thomas A. Graham, San Carlos, Calif., assignor to Smith-Blair, Inc., South San Francisco, Calif., a corporation of California
Filed Aug. 21, 1963, Ser. No. 303,612
5 Claims. (Cl. 24—279)

This invention relates to pipe repair clamps of the type in which rigid lugs are used to bring together the ends of a malleable band that extend around the pipe. More particularly, the invention relates to an improved structure for securing the ends of the band to the lugs.

Pipe clamps utilizing the malleable band attached to rigid lugs are now widely used because of their versatility and effectiveness in meeting various conditions. In more recently developed clamps the problem of bolt bending due to the tendency of the lugs to tip as the bolts are tightened has been largely overcome, and in these improved clamps greater amounts of torque can be applied to draw the lugs together. However, the ability of the lugs to withstand a greater band tightening force increased the problem of securing the ends of the malleable band to the lugs. Accordingly, a general object of the present invention is to provide an improved pipe clamp structure for connecting the malleable bands to a pair of rigid lugs so that the band cannot possibly slip from the lugs or break loose from them, even when an unusually large tightening force is applied to draw the lugs together.

Since the early development of pipe clamps those skilled in the art have sought to provide a connecting structure for attaching the lugs to a flexible band that not only had adequate strength, but was also practical and inexpensive to manufacture. In an early form of pipe clamp the attachment of the band to the lug was accomplished by crimping the band ends into milled slots in the lugs. However, the milling operation was an expensive manufacturing step, and moreover this connection was often not tight enough, the band ends tending to slip out of the slot when pressure was applied during the tightening of the bolts. Any slipping of the band away from the lug made the clamp useless. In other later forms of clamps, attempts were made to solve the problem by the use of auxiliary wedges and rods retained by portions of the lugs to hold the band ends in place. In addition to the extra parts required, this latter attachment method also required complicated manufacturing steps and thus increased the overall cost of the clamps. In a more recent development in the pipe clamp art, as disclosed in U.S. Patent No. 3,089,212, the lugs are cast from a malleable metal material with jaw portions originally in the open position, but bendable to close on the end of the band.

Another object of the present invention is to provide a pipe clamp utilizing the aforesaid feature of bendable lugs of malleable material in combination with a unique preshaped band structure having extended tabs or fingers adapted to cooperate with the lug jaws and to connect the band firmly to the lugs when the lug jaws are closed.

A further important object of the present invention is to provide an improved means for attaching the ends of a malleable band to a pair of rigid lugs that is particularly well adapted for ease and economy of manufacture.

In accordance with the principles of the invention, lugs made from malleable material and originally cast in the spread apart or open position are constructed with a plurality of passages or slots through which a similar number of slightly smaller sized tabs or fingers on the band can extend. The lug passages may be in either the upper or lower lug jaw or at their junction and they are readily formed as the lugs are cast. The band tabs extending through the lug passages are bent back as the jaws are closed. The result is a strong locking connection between the malleable band and the lugs which prevents any movement or slippage of the band even when large forces are exerted in drawing the lugs together.

Other objects, advantages and features of the invention will become apparent from the following detailed description, and from the drawings, in which:

FIG. 1 is a view in elevation and in cross section showing a pipe clamp with band attaching structure embodying the principles of the invention;

FIG. 2 is an enlarged fragmentary and exploded view in section showing one of the lugs of FIG. 1 with the jaws in the open position and the band detached;

FIG. 3 is a fragmentary plan view of the lug and band portion of FIG. 2;

FIG. 4 is a fragmentary view in section showing a somewhat modified form of lug embodying the principles of the invention;

FIG. 5 is a fragmentary view in section showing another modified form of lug according to the invention;

FIG. 6 is a fragmentary view in perspective of the band end portion for the lugs of FIGS. 4 and 5.

Referring to the drawings, FIG. 1 shows a cross sectional view of a pipe clamp 10 embodying the principles of the invention. Generally, the clamp comprises a pair of lug members 11 and 12 that are connected by a series of bolts 13, each having a nut 14 threaded to one end thereof, and thus adapted to move the lugs towards each other when the nuts are tightened. The lug members 11 and 12 that are shown are preferably provided with upwardly extending projections 15 and 16 that are spaced apart along the lugs for supporting the bolts and nuts. The lugs also have a number of stabilizing fingers 17, each of which extends across to and bears on the upper surface of the opposite lug to prevent the lugs from tipping as the bolts are tightened.

The lugs 15 and 16, as shown, may have any desired length and thus any number of bolts 13, depending on the size of the pipe break being repaired. Also, while I have shown a form of lugs having stabilizing fingers 17, for illustrative purposes, it is to be understood that the present invention is not in any way concerned with such fingers, and thus is not limited to lugs having them.

As shown in FIG. 1, the lugs 11 and 12 are each connected to one end of a flexible band or sleeve 18 of a malleable metal material that extends around a gasket 19 covering the leak in the pipe 20 being repaired. The lugs are made from malleable iron or some other suitable metal material which can be bent or coined after casting instead of being brittle like cast iron, for example. Both of the lugs 11 and 12 are identical in all respects relating to the features of the invention, and each is formed with upper and lower jaw portions 21 and 22. When the lugs are cast, the jaws 21 and 22 are in the open position with their inside surfaces 23 and 24, respectively, spread apart, as shown in FIG. 2.

Each lug has a plurality of slot-like passages 25 which extend through the lugs in a direction generally transverse to the axis of the pipe. The passages 25 are spaced apart at predetermined intervals on the lugs and they are readily formed when the lugs are cast by providing lateral extensions on the portion of the lug mold that forms the slot between the open jaws.

In the embodiment shown in FIGS. 1–3, the passages 25 in the lugs 11 and 12 extend from the junction of the jaw members 21 and 22 to the rear face 26 of the lugs. The band 18 has end portions 27 with the well known hook shape in cross section including a portion 28 that is retained between the lug jaws. Along the edge of each band portion 28 are a plurality of band tabs or extensions 29 that are slightly smaller in width and thickness than the passages 25, but are spaced apart the same distance. When the band end portion 28 is placed between the malleable jaws 21 and 22 the band tabs or extensions fit through the lug passages 25 with a portion 30 of each tab extending beyond the outer lug face 26. When the jaws are brought together firmly against the band portion 28, the tab portions 30 are simultaneously bent down to lock the band in position. These bent over tab portions 30 prevent any slippage or movement of the band portion 28 between the lug jaws even though an unusually large tightening force is applied to the bolts 13.

In FIG. 4 a somewhat modified form of the invention is shown wherein a lug 11a is provided with a series of slots 25a in its lower jaw portion 22a. In this embodiment a band 18a is provided with end tabs 29a (FIG. 6) that are extended inwardly from its end edge by means of parallel slits 31, the tabs being thus joined to the band end portion 28a along a line spaced inwardly from its end edge so that they can bend away from the band end portion 28a at this point. When the band is connected to the lug 11a, the band end portion 28a is gripped in the usual manner by the lug jaws, but the tab 29a is bent downward and through the slot 25a. The extreme end portion 30a of the tab member 29a is bent back underneath the lower jaw member 22a when the lug 11a and band 18a are finally assembled. Preferably, a recess 32 is provided for the tab end portion 30a so that it will lie flush with the under surface of the lower jaw member 22a and will not interfere with the band 18a adjacent the pipe being repaired.

Another embodiment of the invention is shown in FIG. 5 wherein a series of slots or passages 25b are formed in the upper jaw member 21b. Here a band similar to the band 18a may be used with the tab members 29a bent upwardly through the slots 25b and with each having an end portion 30b bent back along the top of the lug 11b. In operation both of the lugs 11a and 11b and the bent back end portions 30a and 30b serve to lock the band firmly between the lug jaws and thereby prevent any slippage during even extreme tightening of the lugs.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a pipe clamp of the type having a malleable band with ends secured between jaw portions of lugs, with the lugs in pairs and tightened together by bolts to secure said jaw portions in closed positions on said band ends, the combination of generally hook shaped end portions of said band each having a tab-like locking member extending from the end edge thereof and pairs of lugs, each lug having a pair of malleable jaws between which said end portions fit and passages through said lugs for receiving the said locking members of said band, said locking members extending through said lug passages and being bent back against said lugs when the band end portions are between the lug jaws and said jaws are secured in the closed position thereon.

2. In a pipe clamp of the type having a malleable band with ends secured between jaw portions of lugs, with the lugs in pairs and tightened together by bolts to secure said jaw portions in closed positions on said band ends, the combination of generally hook shaped end portions of said band each having a series of spaced apart tab portions extending from the end edge thereof and pairs of lugs, each lug having a pair of malleable jaws between which said end portions fit and a plurality of spaced apart passages through said lugs for receiving the said tab portions of said band, said tab portions extending through said lug passages and being bent back against said lugs when the band end portions are between the lug jaws and said jaws are secured in the closed position thereon.

3. In a pipe clamp of the type having a malleable band with ends secured between jaw portions of lugs, with the lugs in pairs and tightened together by bolts to secure said jaw portions in closed positions on said band ends, the combination of generally hook shaped end portions of said band each having a series of spaced apart tab portions extending from the end edge thereof and pairs of lugs, each lug having a pair of malleable jaws between which said end portions fit and a plurality of spaced apart passages extending through the upper jaw of said lugs for receiving the said tab portions of said band, said tab portions extending through said lug passages and being bent back against said lugs when the band end portions are between the lug jaws and said jaws are secured in the closed position thereon.

4. In a pipe clamp of the type having a malleable band with ends secured between jaw portions of lugs, with the lugs in pairs and tightened together by bolts to secure said jaw portions in closed positions on said band ends, the combination of generally hook shaped end portions of said band each having a series of spaced apart tab portions extending from the end edge thereof and pairs of lugs, each lug having a pair of malleable jaws between which said end portions fit, and a plurality of spaced apart passages extending through the lower jaw of said lugs for receiving the said tab portions of said band, said tab portions extending through said lug passages and being bent back underneath the lower jaws and adjacent said band around a pipe being repaired when said jaws are secured in the closed position on said band ends.

5. In a pipe clamp of the type having a malleable band with ends secured between jaw portions of lugs, with the lugs in pairs and tightened together by bolts to secure said jaw portions in closed positions on said band ends, the combination of generally hook shaped end portions of said band, a series of spaced apart tab portions extending from the end edge of each said band end portion and pairs of lugs, each lug having a pair of malleable jaws between which said end portions fit and a plurality of slot-like passages extending completely through said lower jaws and spaced apart at the same intervals as said band tab portions, said tab portions extending completely through said lug passages when said band end portions are between said jaws and said jaws are secured in the closed position thereon, and there being a plurality of recesses on the lower surfaces of said lower jaw members adjacent said passages, said tab portions extending through said passages being bent back to fit within said recesses.

References Cited by the Examiner

UNITED STATES PATENTS

| 316,667 | 4/85 | Shannon | 24—265 |
|---|---|---|---|
| 628,882 | 7/99 | Werner | 24—284 |
| 1,406,443 | 2/22 | Cook | 24—276 |
| 1,411,930 | 4/22 | Peterson. | |
| 1,419,897 | 6/22 | Palmer | 24—284 |
| 2,213,022 | 8/40 | Stauffer. | |
| 3,089,212 | 5/63 | Graham et al. | 24—279 |

FOREIGN PATENTS

| 1,258,103 | 2/61 | France. |
|---|---|---|
| 3,417 | 1868 | Great Britain. |
| 259,905 | 7/49 | Switzerland. |

DONLEY J. STOCKING, *Primary Examiner.*